(12) United States Patent
Zeltyn et al.

(10) Patent No.: US 11,954,446 B2
(45) Date of Patent: Apr. 9, 2024

(54) AUTOMATIC FLOW GENERATION FOR VIRTUAL ASSISTANTS

(71) Applicant: International Business Machines Corporation, Armonk, NY (US)

(72) Inventors: Sergey Zeltyn, Haifa (IL); Avi Yaeli, Ramot Menashe (IL)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 17/225,169

(22) Filed: Apr. 8, 2021

(65) Prior Publication Data
US 2022/0327291 A1  Oct. 13, 2022

(51) Int. Cl.
G06F 40/35 (2020.01)
G10L 15/22 (2006.01)
G06F 16/332 (2019.01)

(52) U.S. Cl.
CPC .............. *G06F 40/35* (2020.01); *G10L 15/22* (2013.01); *G06F 16/3329* (2019.01)

(58) Field of Classification Search
CPC ....... G10L 15/22; G06F 40/35; G06F 16/3329
See application file for complete search history.

(56) References Cited

U.S. PATENT DOCUMENTS 10,445,115 B2  10/2019  Brown et al.
10,455,088 B2 * 10/2019  Tapuhi ................. H04M 3/5166
10,832,002 B2 * 11/2020  Kozhaya ............. G06F 11/3438
10,860,629 B1 * 12/2020  Gangadharaiah ... G06F 16/3329
11,093,551 B1 *  8/2021  Natarajan ........... G06F 16/9532
11,172,063 B2 * 11/2021  McGann ................. G10L 15/22

(Continued)

FOREIGN PATENT DOCUMENTS

CN  111597312 A  *  8/2020
CN  111597312 A     8/2020

OTHER PUBLICATIONS

Ham et al., "End-to-End Neural Pipeline for Goal-Oriented Dialogue Systems using GPT-2", Proceedings of the 58th Annual Meeting of the Association for Computational Linguistics, Jul. 5-10, 2020, pp. 583-592.

(Continued)

*Primary Examiner* — Feng-Tzer Tzeng
(74) *Attorney, Agent, or Firm* — G.E. Ehrlich Ltd.

(57) ABSTRACT

Disclosed herein are methods and systems for generating automatically transactional dialog flows for a virtual assistant based on a set of predefined (labeled) transactional flows defining user interaction paths to accomplish one or more tasks. The virtual assistant is represented by a tree structure comprising a plurality of dialog nodes where each transactional flow comprises a respective subset of the nodes descending from a parent node to one or more completion nodes. New transactional flows may be generated automatically based on similarity with the predefined transactional flows, by selecting a candidate node and one of the predefined transactional flows comprising a completion node most similar to the candidate completion node and further selecting a candidate parent node most similar to the parent node of the selected predefined transactional flow. The new transactional flows may be then generated to comprise all descendant nodes of the candidate parent node.

16 Claims, 7 Drawing Sheets

(56) References Cited

U.S. PATENT DOCUMENTS

2017/0316777 A1* 11/2017 Perez ...................... G06F 40/35
2019/0354874 A1 11/2019 Shah et al.
2020/0004874 A1* 1/2020 Gupta ..................... G10L 15/22

OTHER PUBLICATIONS

IBM, "Dialog Overview", IBM Cloud Docs, Nov. 27, 2020, 9 Pages.

Peskov et al., "Multi-Domain Goal-Oriented Dialogues (MultiDoGO): Strategies toward Curating and Annotating Large Scale Dialogue Data", Proceedings of the 2019 Conference on Empirical Methods in Natural Language Processing and the 9th International Joint Conference on Natural Language Processing, Hong Kong, China, Nov. 3-7, 2019, pp. 4526-4536.

Reyes et al., "Methodology for the Implementation of Virtual Assistants for Education Using Google Dialogflow", Advances in Soft Computing. MICAI 2019. Lecture Notes in Computer Science, vol. 11835, 13 Pages.

* cited by examiner

AUTOMATIC FLOW GENERATION FOR VIRTUAL ASSISTANTS

BACKGROUND

The present invention, in some embodiments thereof, relates to generating transactional flows for virtual assistants, and, more specifically, but not exclusively, to generating automatically transactional flows for virtual assistants based on context similarity with predefined flows.

With the rapidly and continuously advancing automation of services, tools and platforms, the use and deployment of virtual assistants, specifically Intelligent Virtual Assistants (IVAs) has become a key technology for a plurality of applications, market needs and/or the like.

The virtual assistants may span across online services chatbot agents such as IBM Watson assistant, Amazon Lex, Microsoft Bot framework, Salesforce chatbot to name a few as well as over Personal Virtual Assistants, specifically, Intelligent Personal Assistants (IPA) such as, for example, Amazon Alexa, Google Assistant, Apple Siri and/or the like.

These virtual assistants and others which are configured to interact with human users to provide information and/or assist in accomplishing tasks have developed immensely in recent years both in architecture, scale and capabilities to effectively interact with human users. In particular, while in the past less advanced virtual assistants were primarily based on predefined scripts and flows, modern virtual assistants are context related and configured to adapt, evolve and react to human interaction in a human-like dialog implementation.

As such, coupled with advanced efficient Natural Language Processing (NLP) tools and ever evolving Artificial intelligence (AI), the context based virtual assistants may offer a highly advanced and efficient automated services for efficiently assisting human users in a plurality of fields such as, for example, customer support, customer care, task guidance, information centers and many more.

SUMMARY

It is an object of the present invention to provide, methods, systems and software program products for generating automatically transactional flows for virtual assistants based on a limited and typically a small number of predefined transactional flows. The foregoing and other objects are achieved by the features of the independent claims. Further implementation forms are apparent from the dependent claims, the description and the figures.

According to a first aspect of the present invention there is provided a method of generating automatically transactional dialog flows for a virtual assistant, comprising using one or more processors for:

Obtaining a tree structure representing a virtual assistant and comprising a plurality of dialog nodes.

Analyzing a set of predefined transactional flows each comprising a respective subset of a plurality of subsets. Each subset comprising respective nodes of the plurality of dialog nodes descending from a respective parent node to respective one or more completion nodes.

Selecting a candidate completion node which is not included in the plurality of subsets of the predefined transactional flows.

Computing a similarity score for the candidate completion node with respect to each completion node in each of the plurality of subsets.

Selecting one of the plurality of subsets comprising a respective completion node producing a highest similarity score.

Computing a similarity score for each candidate parent node of a plurality of dialog nodes which are ancestors of the candidate completion node with respect to the parent node of the selected subset.

Selecting a candidate parent node having a highest similarity score.

Generating automatically a new transactional flow of the virtual assistant comprising a respective subset of respective nodes of the plurality of dialog nodes which are descendants of the selected parent node.

According to a second aspect of the present invention there is provided a system for generating automatically transactional dialog flows for a virtual assistant, comprising one or more processors configured to execute a code. The code comprising:

Code instructions to obtain a tree structure representing a virtual assistant and comprising a plurality of dialog nodes.

Code instructions to analyze a set of predefined transactional flows each comprising a respective subset of a plurality of subsets. Each subset comprising respective nodes of the plurality of dialog nodes descending from a respective parent node to respective one or more completion nodes.

Code instructions to select a candidate completion node which is not included in the plurality of subsets of the predefined transactional flows.

Code instructions to compute a similarity score for the candidate completion node with respect to each completion node in each of the plurality of subsets.

Code instructions to select one of the plurality of subsets comprising a respective completion node producing a highest similarity score.

Code instructions to compute a similarity score for each candidate parent node of a plurality of dialog nodes which are ancestors of the candidate completion node with respect to the parent node of the selected subset.

Code instructions to select a candidate parent node having a highest similarity score.

Code instructions to generate automatically a new transactional flow of the virtual assistant comprising a respective subset of respective nodes of the plurality of dialog nodes which are descendants of the selected parent node.

According to a third aspect of the present invention there is provided a computer program product for generating automatically transactional dialog flows for a virtual assistant, the computer program product comprising one or more computer readable storage medias having thereon:

First program instructions executable by one or more processors to cause the one or more processors to obtain a tree structure representing a virtual assistant and comprising a plurality of dialog nodes.

Second program instructions executable by the one or more processors to cause the one or more processors to analyze a set of predefined transactional flows each comprising a respective subset of a plurality of subsets. Each subset comprising respective nodes of the plurality of dialog nodes descending from a respective parent node to respective one or more completion nodes.

Third program instructions executable by the one or more processors to cause the one or more processor to select a candidate completion node which is not included in the plurality of subsets of the predefined transactional flows.

Fourth program instructions executable by the one or more processors to cause the one or more processors to compute a similarity score for the candidate completion node with respect to each completion node in each of the plurality of subsets.

Fifth program instructions executable by the one or more processors to cause the one or more processors to select one of the plurality of subsets comprising a respective completion node producing a highest similarity score.

Sixth program instructions executable by the one or more processors to cause the one or more processors to compute a similarity score for each candidate parent node of a plurality of dialog nodes which are ancestors of the candidate completion node with respect to the parent node of the selected subset.

Seventh program instructions executable by the one or more processors to cause the one or more processors to select a candidate parent node having a highest similarity score.

Eighth program instructions executable by the one or more processors to cause the one or more processors to generate automatically a new transactional flow of the virtual assistant comprising a respective subset of respective nodes of the plurality of dialog nodes which are descendants of the selected parent node.

In a further implementation form of the first, second and/or third aspects, the candidate completion node is selected from a plurality of evaluated candidate completion nodes which is not included in the plurality of subsets according to highest similarity score of the evaluated candidate completion nodes with each completion node in each of the plurality of subsets.

In an optional implementation form of the first, second and/or third aspects, one or more additional candidate completion nodes are selected for generating one or more additional new transactional flow of the virtual assistant.

In an optional implementation form of the first, second and/or third aspects, one or more alternative candidate completion nodes are selected in case the new transactional flow is rejected.

In a further implementation form of the first, second and/or third aspects, the similarity score is computed by aggregating a plurality of similarity sub-scores, each of the plurality of similarity sub-scores is computed between respective attributes of a plurality of attributes of each of the nodes for which the similarity score is computed.

In a further implementation form of the first, second and/or third aspects, each of the plurality of dialog node is associated with one or more of a plurality of attributes comprising: a node identifier, an identifier of a parent node, an identifier of a next execution node, a node condition, a condition of a parent node, a condition of a next execution node, a value of a context variable of the node, a value of a context variable of a parent node, a value of a context variable of a next execution node, a response text of the node, a response text of a parent node, a response text of a next execution node, a node level in the tree structure, a node category, a category of a parent node, and/or a category of a next execution node.

In a further implementation form of the first, second and/or third aspects, the similarity score is computed based on one or more algebraic operators for numeric attributes.

In a further implementation form of the first, second and/or third aspects, the similarity score is computed based on Levenshtein distance for string based attributes.

In a further implementation form of the first, second and/or third aspects, the similarity score is computed based on cosine similarity of sentence embeddings for string based attributes.

In a further implementation form of the first, second and/or third aspects, each of the plurality of similarity sub-scores is computed for a respective attribute that is available for one or more of the nodes for which the similarity score is computed.

In a further implementation form of the first, second and/or third aspects, the respective similarity sub-score computed for one or more of the attributes is set to zero (0) in case the respective attribute available for only one of the nodes for which the similarity score is computed.

In an optional implementation form of the first, second and/or third aspects, one or more of the plurality of attributes is assigned a weight for the computation of the similarity score.

In an optional implementation form of the first, second and/or third aspects, the new transactional flow is adjusted according to analytics collected for the new transactional flow.

In an optional implementation form of the first, the new transactional flow is adjusted according to one or more changes in the tree structure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
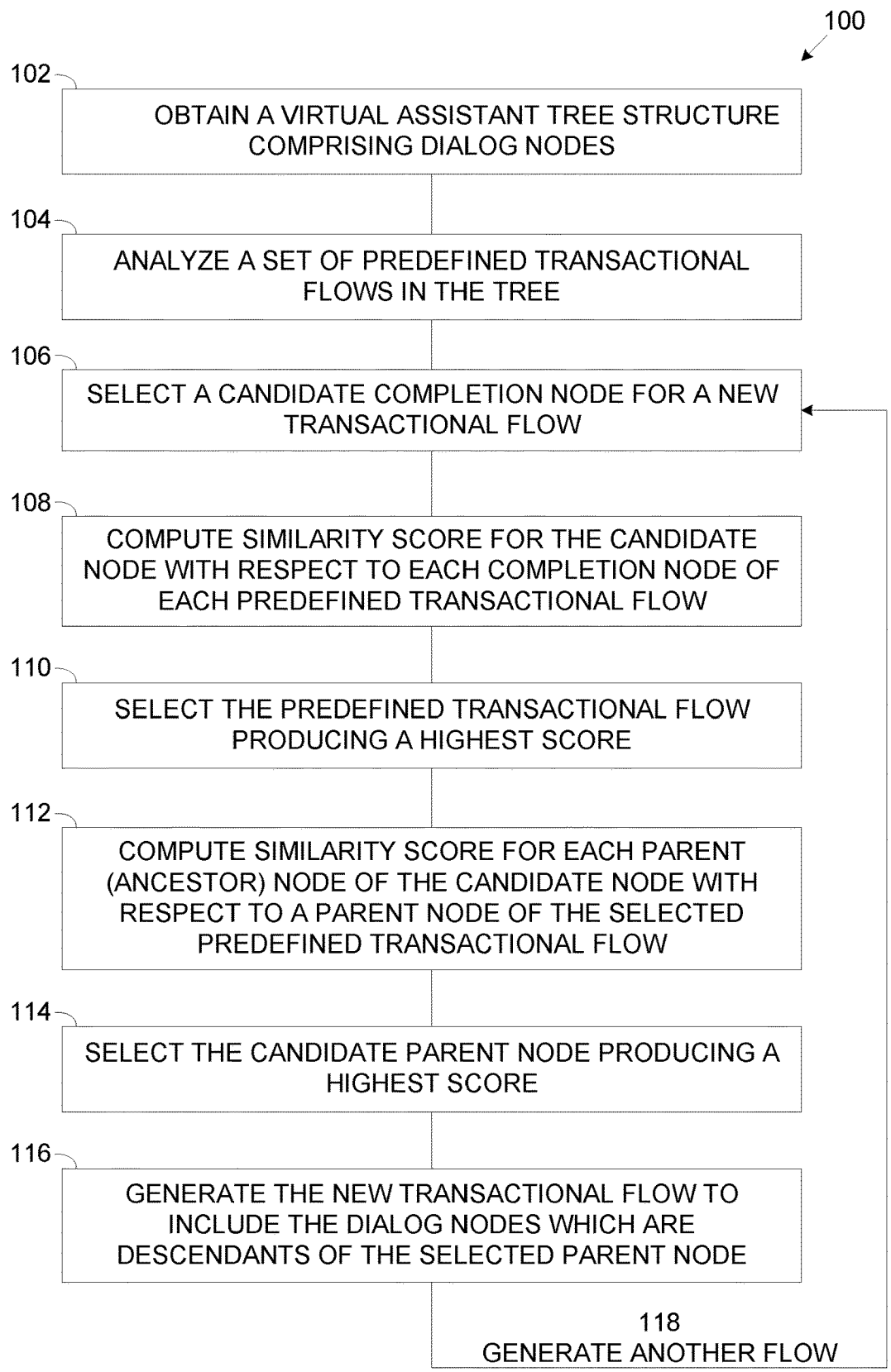
FIG. 1 is a flowchart of an exemplary process of generating automatically transactional flows for virtual assistants, according to some embodiments of the present invention.

The present invention, in some embodiments thereof, relates to generating transactional flows for virtual assistants, and, more specifically, but not exclusively, to generating automatically transactional flows for virtual assistants based on context similarity with predefined flows.

Virtual assistants, Intelligent Virtual Assistants (IVA), chatbots, software bots, virtual guidance services, personal virtual assistants, Intelligent Personal Assistants (IPA) and/or the like collectively designated virtual assistants herein after are software agents designed, adapted and/or configured inform, assist, support and/or guide one or more human users.

The virtual assistants may therefore include online virtual assistants, for example, IVAs, chatbots, virtual guidance services and/or the like such as, for example, IBM Watson assistant, Amazon Lex, Microsoft Bot framework, Salesforce chatbot and/or the like configured to inform, assist, support and/or guide one or more online users. The virtual assistants may further include the personal virtual assistants, IPAs and/or the like such as, for example, Amazon Alexa, Google Assistant, Apple Siri and/or the like typically executed and/or delivered thorough one or more local devices, for example, a Smartphone, a smart home controller, a smart speaker, and/or a dedicated specifically adapted device configured to inform, assist, support and/or guide one or more users.

One or more of the virtual assistants may be further configured to control one or more devices, systems, platforms and/or services, for example, home smart appliances (e.g. lights, air-conditioning systems, multimedia devices, etc.), IoT devices and/or the like, specifically according to interaction with the users.

Each virtual assistant may comprise a plurality of flows each directed to assist the users, for example, provide information, guide an execution of one or more tasks and/or the like. The flows may thus include informational flows configured to interact with one or more users to provide information relating to one or more subjects, fields, domains and/or the like, for example, a Frequently Asked Question (FAQ), weather information, a service information and/or the like. The flows may further include transactional flows configured to interact with one or more users to guide, direct and/or otherwise assist one or more users to accomplish one or more tasks, for example, create a password, reset a password, get a software product license, schedule an appointment, create an account, initiate a video session, fix a malfunctioning device and/or the like.

Typically, as known in the art, each virtual assistant may be represented, modeled and/or constructed by a tree like structure (model) comprising a plurality of dialog nodes each designed, configured and/or otherwise characterized by one or more parameters, conditions, actions, user interactions, user responses, links to next nodes and/or the like which may be expressed by one or more of a plurality of node attributes associated with the respective dialog node.

Each of the flows, for example, the informational flows and/or the transactional flows may therefore define a flow (path) propagating through the virtual assistant tree structure according to the task assigned to the respective flow. Specifically, each flow may define a path descending from a parent dialog node which is the flow starting point via one or more intermediate dialog nodes to one or more completions dialog nodes where the flow ends.

According to some embodiments of the present invention, there are provided methods, systems and computer program products for generating automatically one or more new flows for one or more of the virtual assistants, in particular one or more new transactional flows whose performance may be evaluated using one or more Key Performance Indicators (KPI). Such KPIs, for example, successful task accomplishment, task not accomplished, flow abandonment, total time to accomplish task, time per each step in the flow and/or the like. In particular, the transactional flows may be evaluated based on KPI analytics collected and computed based on interaction with a large number of users.

The transactional flows may be generated automatically based on a limited set of predefined transactional flows labeled and approved for the virtual assistant. One or more of the predefined transactional flows may be manually defined by one or more users, for example, an expert, a designer and/or the like. Optionally, one or more of the predefined transactional flows may be derived from one or more other virtual assistants and/or from one or more previous versions of the virtual assistant.

The automated generation of the transactional flows is based on two observations which are typical and/or applicable for most if not all virtual assistants known in the art. First, each of the dialog nodes may be included in only a single transactional flow. As such, each of the transactional flows may include a respective subset of dialog nodes of the plurality of dialog nodes of the tree structure representing the virtual assistant.

Moreover, most and typically all of the transactional flows follow and/or conform to a limited number of design patterns such that the parent and completion nodes of distinct transactional flows may be significantly similar in terms of their node attributes. This means that the parent nodes and/or completion nodes of different transactional flows may be at least partially similar, i.e. have one or more node attributes which are at least partially similar and/or related. Specifically, the parent nodes and/or completion nodes of different transactional flows may include one or more similar and/or related contextual node attributes, for example, a node condition, a parent node condition, a next execution node condition, a value of a context variable, a value of a context variable of the parent node, a value of a context variable of the next execution node, a response text of the node, a response text of the parent node, a response text of the next execution node, the node level in the tree structure, the node category, the category of the parent node, the category of the next execution node and/or the like.

Therefore, in order to generate a new transactional flow, a candidate completion node may be first selected for the new transactional flow. Based on the first observation, the candidate completion node is selected from all dialog nodes which are not already included in any of the subsets of the labeled transactional flows, for example, the predefined transactional flows. Based on the second observation, the candidate completion node may be compared to each of the completion nodes of all of the predefined transactional flows to determine similarity of the candidate completion node to each of the completion nodes.

The similarity between the candidate completion node and each of the completion nodes may be computed using one or more methods, techniques and/or algorithms employing one or more metrics. For example, a similarity score may be computed to express the similarity between the candidate completion node and each of the completion nodes of the predefined transactional flows. The similarity score may aggregate a plurality of similarity sub-scores each computed for a respective node attribute available for one of the two compared dialog nodes. The metrics used to compute the similarity may include, for example, one or more numeric metrics for numeric attributes, for example, a category ID, a parent ID, a next action node Id and/or the like. In another example, the metrics may include one or more strings comparison metrics which may be used to compute similarity between strings (e.g. text, characters, etc.), for example, Levenshtein distance, cosine distance and/or the like.

After computing the similarity score for the selected candidate completion node with respect to each of the completion nodes of each of the predefined transactional flows, the predefined transactional flow comprising the completion node which produces the highest similarity score with the candidate completion node may be selected.

However, the candidate completion node may have a plurality of ancestor nodes in the tree structure representing the virtual assistant. To select a candidate parent node for the new transactional flow from among the ancestor nodes of the candidate completion node, again the two observations are applied. First, the candidate parent node may be selected from ancestor nodes of the candidate completion node which are not included in any of the subsets of the predefined transactional nodes. Moreover, based on the second observation, the candidate parent node may be selected based on its similarity to the parent node of the selected predefined transactional flow. To this end the similarity score may be computed for each candidate parent node which is an ancestor of the candidate completion node with respect to the parent node of the selected predefined transactional flow. As described herein before, the similarity score may aggregate a plurality of similarity sub-scores each computed for a respective node attribute of each of the candidate parent nodes with respect to the respective attribute of the parent node of the selected predefined transactional flow.

The candidate parent node producing the highest similarity score with the parent node of the selected predefined transactional flow may be then selected as the parent node for the new transactional flow. The transactional flow may be generated automatically to include all dialog nodes which are descendants of the selected parent node, specifically such dialog nodes which are not included in any of the subsets of the predefined transactional flows.

The process may be repeated to generate one or more additional new transactional flows for the virtual assistant.

Optionally, one or more of the newly generated transactional flows may be evaluated and/or analyzed either manually and/or automatically to approve or reject the respective transactional flow. Approved transactional flows may be added (applied) to the virtual assistant while rejected transactional flows may be discarded.

Optionally, one or more of the rejected transactional flows may be adjusted to fix, cure and/or overcome the rejection. In particular, the process may be repeated for one or more of the rejected transactional flows where an alternative (different) candidate completion node and/or an alternative candidate parent node may be selected.

According to some embodiments of the present invention, one or more of the flows, in particular the labeled transactional flows may be maintained after the virtual assistant is deployed for use. For example, interaction with users may be monitored and logged to extract and/or compute analytics and/or statistics for one or more of the labeled transactional flows, for example, success rate, failure rate, abandonment rate, abandonment point, potential failure root causes and/or the like. In another example, the tree structure representing the virtual assistant may be monitored and tracked to identify changes which may affect one or more of the labeled transactional flows may be affected by one or more of the changes in the tree structure.

Optionally, one or more of the labeled transactional flows may be automatically adjusted, amended and/or altered based on the collected analytics and/or according to one or more of the detected changes in the virtual assistant's tree structure.

Automatically generating the transactional flows may present major advantages and benefits compared to currently existing methods and systems for generating transactional flows.

First, while there exist frameworks and methods for virtual assistant design, these methods do not establish a practical and consistent methodology for generating (labeling) flows. Automatically generating the transactional flows, on the other hand may establish a coherent and clear methodology for generating the flows, in particular the transactional flows.

Moreover, most and probably all of the existing methods for generating virtual assistant flows may rely on manual (e.g. expert users, designers, etc.) generation and labeling of the flows, including the transactional flows. This manual flow generation and labeling may be highly inefficient, time consuming, prone to human errors and may require significant analysis computing resources (e.g. processing resources, processing time, storage resources, etc.). In contrast, the automatic transactional flows generation may require only a very limited number of predefined transactional flows to generate multiple additional transactional flows thus significantly reducing the generation time compared to the manual generation of new transactional flows, reduce the required computing resources while improving the quality and/or performance of the newly generated transactional flows which may be free of human errors.

The automatic transactional flows generation was validated in an experiment in which one ⅓ of the transactional flows of an IBM Watson based virtual assistant were predefined transactional flows, i.e. the set of labeled predefined transactional flows included ⅓ of the overall number of transactional flows of the virtual assistant. It was found that the automatic transactional flows generation succeeded to correctly determine 100% of completion nodes and more than 50% of parent nodes of other flows generated automatically based on the set of predefined transactional flows. It was further found that in all cases, the parent nodes selected (suggested) automatically for the newly generated transactional flows were significantly similar (close) to the actual parent nodes of these transactional flows.

Furthermore, automatically generating the transactional flows may be highly scalable compared to the manual generation in particular since there exist complex virtual assistants configured to support dozens and even hundreds of tasks, for example, virtual assistants of large financial institutions (e.g. banks, credit card companies, etc.), telecom companies, government offices and authorities and/or the like.

In addition, automatically collecting and/or computing analytics and statistics for the transactional flows based on the KPIs may be used to improve the performance of the transactional flows, for example, improved success rate, reduced time, reduced failure rate, reduced abandonment and/or the like compared to the existing manual methods which may typically lack even coherent flow information collection methodologies. Moreover, automatically adjusting one or more of the transactional flows based on the collected analytics may further improve the performance of the transactional flows while reducing time, computation resources and/or cost compared to the existing which may rely on highly professional and hence expensive, tedious and time consuming manual work.

Also, automatically monitoring and tracking changes in the virtual assistant structure which may affect one or more of the transactional flows may be further applied to ensure efficiency, consistency, accuracy, reliability and/or robustness of the respective transactional flows by amending adjusting or even discarding such transactional flows which are no longer consistent with the updated structure. Moreover, automatically adjusting one or more of the affected transactional flows according to the detected structural changes may significantly increase the efficiency, consistency, accuracy, reliability and/or robustness of the transactional flows while reducing time, computation resources and/or cost compared to the existing which may rely on highly professional and hence expensive, tedious and time consuming manual work.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of generating automatically transactional flows for virtual assistants, according to some embodiments of the present invention.

An exemplary process 100 may be executed for generating automatically one or more new flows for one or more virtual assistants, virtual bots and/or the like collectively designated virtual assistants herein after which may be typically represented by a tree like structure comprising a plurality of dialog nodes since execution graph dialogue modeling is one of the most popular methods for constructing and implementing task-oriented virtual assistants.

Each virtual assistant may comprise a plurality of flows which constitute a path via a plurality of dialog nodes descending form a parent node to one or more completion nodes. The flows of may include informational flows configured to provide information to one or more users and transactional flows configured to assist one or more users to accomplish one or more tasks, conduct one or more actions and/or the like.

The process 100 is directed, in particular to generate automatically one or more new transactional flows for one or more of the virtual assistants which may be subject to performance evaluation using one or more KPIs whereas evaluating the informational flows may be very difficult and hence significantly hard to automatically generate in an efficient manner.

The transactional flows may be generated automatically based on a limited set of transactional flows predefined for the respective virtual assistant(s) which may be user defined, derived from one or more other virtual assistants and/or previous versions of the virtual assistant(s) and/or the like.

Figure 2:
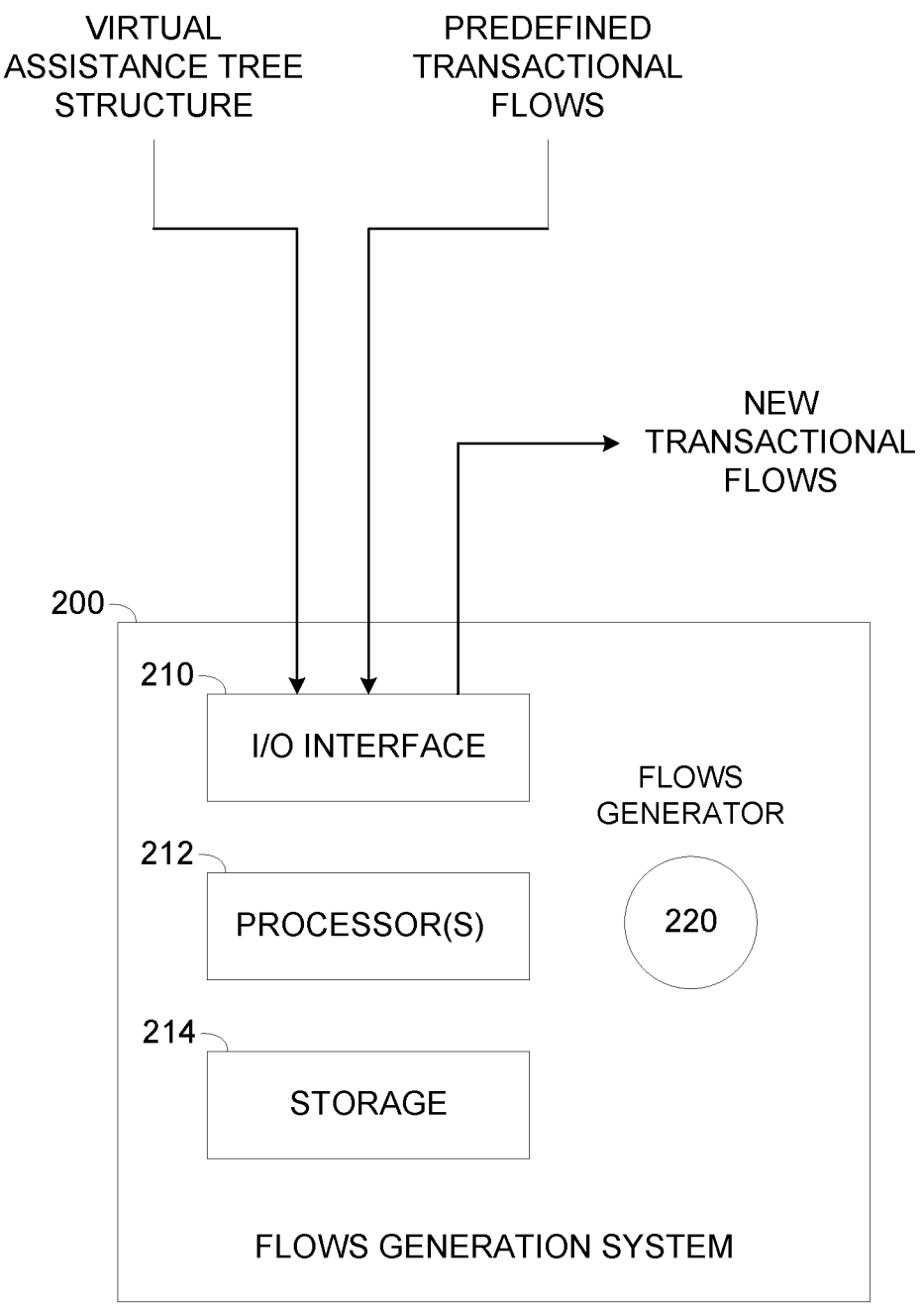
FIG. 2 is a schematic illustration of an exemplary system for generating automatically transactional flows for virtual assistants, according to some embodiments of the present invention.

Reference is also made to FIG. 2, which is a schematic illustration of an exemplary system for generating automatically transactional flows for virtual assistants, according to some embodiments of the present invention.

An exemplary flows generation system 200, for example, a computer, a server, a processing node, a cluster of computing nodes and/or the like may be configured to execute a process such as the process 100 for computing instructions for generating automatically one or more transactional flows for one or more of virtual assistants.

The virtual assistants, also designated Intelligent Virtual Assistants (IVA), are software agent configured to interact with individuals (human users) to provide one or more services to the users, for example, provide information, provide support, guide through execution of tasks and/or the like.

The virtual assistants may include online virtual assistants, also known as chatbots such as, may include one or more virtual bots, chatbots and/or virtual guidance services such as, for example, IBM Watson assistant, Amazon Lex, Microsoft Bot framework, Salesforce chatbot and/or the like configured to inform, assist, support and/or guide one or more users. The virtual assistants may further include one or more Personal Virtual Assistants, specifically, Intelligent Personal Assistants (IPA) such as, for example, Amazon Alexa, Google Assistant, Apple Siri and/or the like typically executed and/or delivered thorough one or more local devices, for example, a Smartphone, a smart home controller, a smart speaker, and/or a dedicated specifically adapted device configured to inform, assist, support and/or guide one or more users and optionally to further control one or more devices, systems and/or services, for example, home smart appliances (e.g. lights, air-conditioning systems, multimedia devices, etc.), IoT devices and/or the like, specifically according to interaction with the users.

The flows generation system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the flows generation system 200 may obtain, for example, fetch, receive, acquire and/or the like the tree structure of one or more of the virtual assistants.

For example, the flows generation system 200 may connect to one or more of the networks, through the network interface(s) available in the I/O interface 210, to communicate with one or more networked resources storing one or more of the tree structures. In another example, the flows generation system 200 may access one or more attachable devices attached to interconnection interface(s) available in the I/O interface 210, for example, a USB storage media device storing one or more of the tree structures.

Moreover, via the I/O interface 210, the flows generation system 200 may obtain, for example, fetch, receive, acquire and/or the like a set of predefined transactional flows of each of the virtual assistant(s), for example, from one or more networked resources, one or more attachable devices and/or the like.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the road markings generation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a flows generator 220 functional module for executing the process 100 to generate one or more transactional flows for one or more of the virtual assistants.

The flows generator 220 may further output the automatically generated new transactional flow(s) which may be updated in the respective virtual assistant(s).

Optionally, the flows generation system 200, specifically the flows generator 220 are provided, implemented and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

For brevity, the process 100 executed by flows generator 220 is described for generating one or more transactional flows for a single virtual assistant. This, however, should not be construed as limiting since the process 100 may be expanded for generating transactional flows for a plurality of virtual assistants.

As shown at 102, the process 100 starts with the flows generator 220 receiving a tree structure representing a virtual assistant, for example, via the I/O interface 210, for example, from one or more remote networked resources, one or more of the attachable devices and/or the like.

As described herein before, the tree structure representing the virtual assistant may comprise a plurality of dialog nodes. Each of the dialog nodes may relate to one or more other nodes and may be characterized by one or more node attributes associated with each node. The node attributes may include, for example, a node identifier (ID), an ID of a parent node, an ID of a next execution node, a node condition, a condition of a parent node, a condition of a next execution node, value of one or more context variables of the node, value of one or more context variables of a parent node, value of one or more context variables of a next execution node, a response text of the node, a response text of a parent node, a response text of a next execution node, a node level in the tree structure, a node category (e.g., standard node, folder, response condition, frame, slot, event handler, etc.), a category of a parent node, a category of a next execution node and/or the like.

The node attributes may be defined, constructed and/or associated with each dialog node as known in the art. For example, each condition attribute may relate to one or more context variables, user intents, entities and/or the like. Moreover, each of the conditions may define digression into the associated node and away from the associated node. In another example, the node response attribute may define a repose to the user interacting with the virtual assistant, for example, text, list of options, pause instructions and/or the like.

One or more flows, either informational flows and/or transactional flows may be defined for each of the virtual assistants. Each of the transactional flows may define an interaction flow with a user to assist, support and/or guide the user to accomplish one or more tasks, for example, reset a password, get a software product license, schedule an appointment, create an account, initiate a video session, fix a malfunctioning device and/or the like.

Each transactional flow may therefore express a flow (path) descending form a parent node where the user interaction relating to the respective task(s) is initiated to one or more completion nodes where the user interaction relating to the respective task(s) ends, for example, task accomplished, task abandoned, task failed and/or the like. Descending from the parent node to the completion node(s), the path defined by each transactional flow may traverse one or more other nodes. Each of the transactional flows may therefore include at least a subset of dialog nodes of the plurality of dialog nodes of the tree structure representing the virtual assistant.

Each of the dialog nodes may be therefore characterized by one or more parameters, conditions, actions, user interactions, links to next nodes and/or the like which may be expressed by one or more of a plurality of node attributes associated with the respective dialog node.

At each user interaction turn along each of the transactional flows, one or more of the dialogue nodes may be triggered according to the node condition(s) and trigger a corresponding node such that the transactional flow is followed along the triggered nodes to check the user input against any child node conditions. The node triggering and/or node actions may depend, for example, on results of NLP analysis which extracts intents and/or entities from user inputs. In another example, the node triggering and/or node actions may depend on the value of one or more of the contextual attributes of the nodes. In another example, the node triggering and/or node actions may depend on one or more execution commands, for example, a jumps to another node in the dialog tree and/or the like.

Typically, each of the dialog nodes is included in a single transactional flow. As such, each of the transactional flows may include a respective subset of dialog nodes of the plurality of dialog nodes of the tree structure.

Moreover, most and often all of the transactional flows typically follow and/or conform to a limited number of design patterns such that the parent and completion nodes of distinct transactional flows may be significantly similar in terms of their attributes. This means that the parent nodes and/or completion nodes of different transactional flows may be at least partially similar, i.e. have one or more node attributes which are at least partially similar and/or related.

Specifically, the parent nodes and/or completion nodes of different transactional flows may include one or more similar and/or related contextual node attributes, for example, the node condition, the parent node condition, the next execution node condition, a value of a context variable of the node, a value of a context variable of the parent node, a value of a context variable of the next execution node, a response text of the node, a response text of the parent node, a response text of the next execution node, the node level in the tree structure, the node category, the category of the parent node, the category of the next execution node and/or the like.

Figure 3A:
FIG. 3A, FIG. 3B and FIG. 3C illustrate an exemplary tree structure representing an exemplary virtual assistant including an exemplary automatically generated transactional flow, according to some embodiments of the present invention.
Figure 3B:
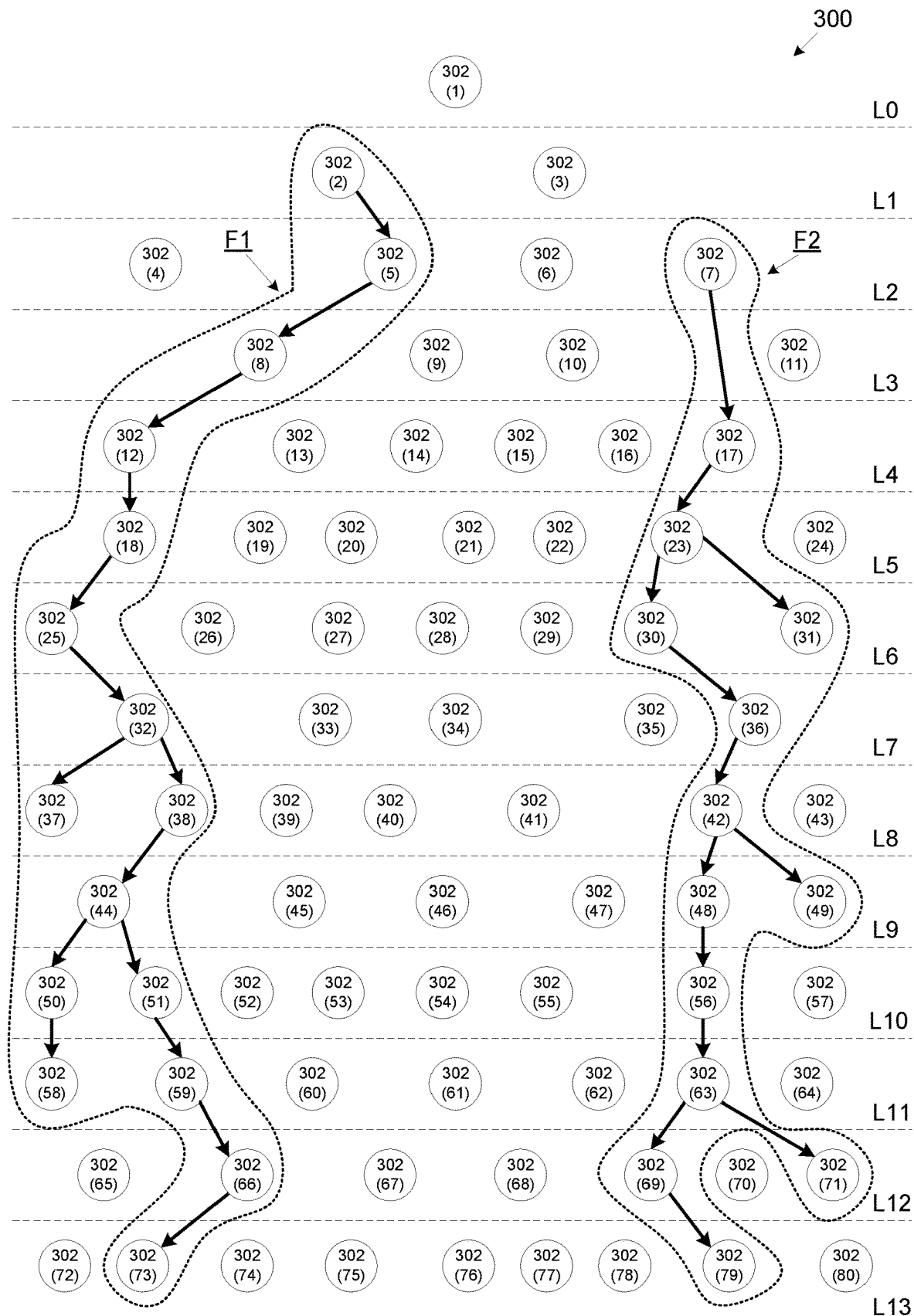
Figure 3C:
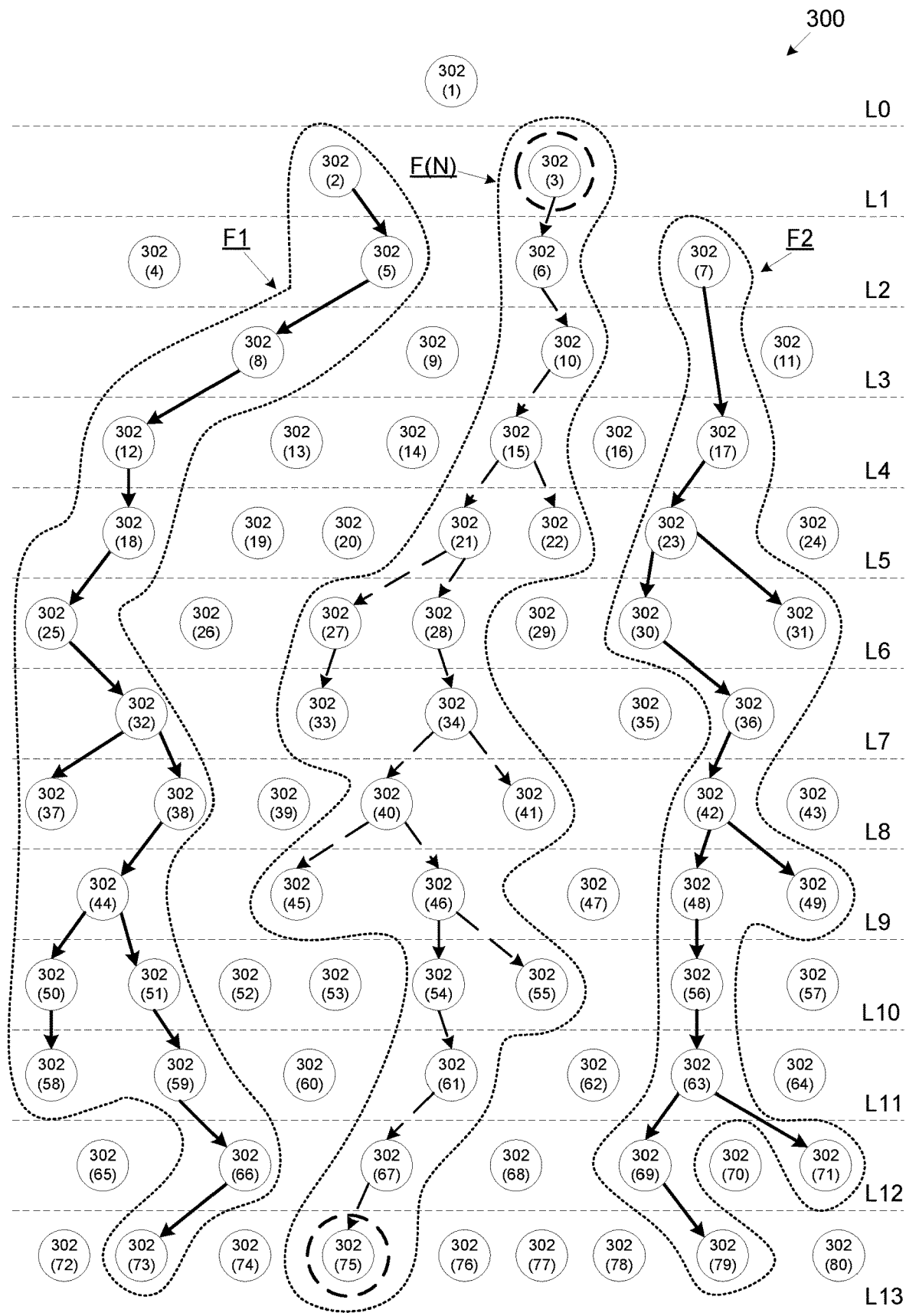

Reference is now made to FIG. 3A, FIG. 3B and FIG. 3C, which illustrate an exemplary tree structure representing an exemplary virtual assistant including an exemplary automatically generated transactional flow, according to some embodiments of the present invention.

As shown in FIG. 3A, an exemplary tree structure 300 may represent an exemplary virtual assistant and/or part thereof. The tree structure may include a plurality of dialog nodes 302 arranged in a plurality of tree levels, for example, nodes 302(1), 302(2), 302(3) and so on the 302(80) arranged in thirteen tree levels L0, L1, L3 and so on to L13.

As shown in FIG. 3B, one or more flows, for example, transactional flows may be defined in the tree structure 300 where each of the transactional flows defines a flow (path) propagating among a subset of nodes of the plurality of dialog nodes 302. In particular, each of the flows defines a flow descending from a parent node included in the respective subset through one or more intermediate nodes to one or more completion nodes.

For example, a first exemplary transactional flow F1 may include a first subset of the plurality of dialog nodes 302, for example, nodes 302(2), 302(5), 302(8), 302(12), 302(18), 302(25), 302(32), 302(37), 302(38), 302(44), 302(50), 302 (51), 302(58), 302(59), 302(66) and 302(73). As seen, the transactional flow F1 descends from a parent node, specifically, node 302(2) to three completion nodes, namely the nodes 302(37), 302(58) and 302(73) via some intermediate nodes of the first subset, for example, the nodes 302(8), 302(12), 302(18), 302(25), 302(32), 302(38), 302(44), 302 (51), 302(59) and 302(66).

In another example, a second exemplary transactional flow F2 may include a second subset of the plurality of dialog nodes 302, for example, nodes 302(7), 302(17), 302(23), 302(30), 302(31), 302(36), 302(42), 302(48), 302 (49), 302(56), 302(63), 302(69), 302(71) and 302(79). As seen, the transactional flow F2 descends from a parent node, specifically, node 302(7) to four completion nodes, namely the nodes 302(31), 302(49), 302(71), 302(79) and 302(66) via some intermediate nodes of the second subset, for example, the nodes 302(17), 302(23), 302(30), 302(36), 302(42), 302(48), 302(56), 302(63) and 302(69).

Reference is made once again to FIG. 1.

As shown at 104, the flows generator 220 may analyze a set of predefined transactional flows defined for the virtual assistant, for example, via the I/O interface 210, for example, from one or more remote networked resources, one or more of the attachable devices and/or the like.

The set of predefined transactional flows may include a very limited number of flows, for example, 5-15% of the overall number of transactional flows of the virtual assistant. For example, assuming in a certain virtual assistant support up to 30 transactional flows, the set of may include 3-5 predefined transactional flows. The predefined transactional flows may originate from one or more sources and/or generated using one or more paradigms and/or methodologies. For example, one or more of the predefined transactional flows may be manually defined by one or more users, for example, an expert, a designer and/or the like. In another example, one or more of the predefined transactional flows of one or more of the virtual assistant(s) may be derived from one or more previous versions of the respective virtual assistant. In another example, one or more of the predefined transactional flows of one or more of the virtual assistant(s) may be derived from one or more other (different) virtual assistants.

As shown at 106, the flows generator 220 may select a candidate completion node for a new transactional flow created automatically for the virtual assistant by defining a new path through the tree structure of the virtual assistant.

As described herein before, since each transactional flow may include a respective subset of the plurality of dialog nodes of the tree structure representing the virtual assistance, each dialog node may typically be part of only a single transactional flow.

The flows generator 220 may therefore select the candidate completion node from the dialog nodes which are not included in any labeled transactional flow, specifically not included in any of the plurality of subsets of dialog nodes of the set of predefined transactional flows. The labeled transactional flows are transactional flows which are already defined and approved for the virtual assistant.

While the labeled transactional flows include the received set of predefined transactional flows, the labeled transactional flows may further include one or more transactional flows which were previously generated automatically by the flows generator 220.

For example, assuming the flows generator 220 processes the exemplary tree structure 300 representing the virtual assistant and/or part thereof. As seen in FIG. 3C, the flows generator 220 may select for the new transactional flow, designated F(N), a candidate completion node from the nodes 302 which are not included in the predefined and labeled transactional flows F1 and F2, for example, dialog node 302(75).

As shown at 108, the flows generator 220 may compute a similarity score for the candidate completion node with respect to each completion node of the set of labeled transactional nodes, for example, the set of predefined transactional flows.

As described herein before, due to the fact that the transactional flows typically follow and/or conform to few design patterns, the completion nodes of different transitional flows may be significantly similar in terms of their contextual node attributes. The flows generator 220 may therefore compute the similarity score for the candidate completion node to identify one or more other transactional flows, for example, predefined transactional flows which contain completion nodes which are significantly similar to the candidate completion node.

The flows generator 220 may apply one or more methods, techniques, algorithms and/or calculations for computing similarity between dialog nodes, specifically based on similarity of the node attributes of the compared nodes. For example, the flows generator 220 may apply the computation expressed in equation 1 below to compute a Node Similarity Score (NSS) $S(N_1, N_2)$ for two dialog nodes $N_1$ and $N_2$ based on similarity between one or more node attributes identified for the nodes $N_1$, $N_2$.

$$S(N_1, N_2) = \Sigma_{i=1}^{M} W_i \cdot S_A(A_i(N_1), A_i(N_2)) \quad \text{Equation 1:}$$

Where $A_i(N_j)$ is the i-th attribute of node $N_j$, $S_A$ is similarity between attributes, M is an overall number of attributes identified for the nodes $N_1$ and $N_2$, and $W_i \geq 0$, $1 \leq i \leq M$, are weights.

As seen in equation 1, the flows generator 220 may compute the NSS $S(N_1, N_2)$ for nodes $N_1$ and $N_2$ by aggregating the plurality of similarity sub-scores $S_A$ between multiple respective attributes of each of the nodes $N_1$ and $N_2$.

The Weights $W_i$ may be assigned to one or more of the node attributes according to one or more methods, techniques and/or implementations. For example, the weights may be assigned to the node attributes according to their importance, contribution and/or the like. For example, assuming a certain tree stricture model representing a certain virtual assistant involves many context variables attributes. In such case the weight assigned and/or corresponding to each context variable attribute may be smaller than the weights assigned/or corresponding to other node attributes, for example, the node title, the node response and/or the like.

The flows generator 220 may use one or more metrics for computing the similarity between respective attributes of the two nodes.

For example, for one or more numeric node attributes, for example, the tree level number, the tree level number of the parent node, the ID of a next linked node, the ID of the parent node, a category ID and/or the like, the flows generator 220 may compute the similarity between values of the numeric node attribute(s) based on one or more algebraic operators. For example, the flows generator 220 may apply the equality operator to determine whether the values of one or more numeric attributes of the two nodes are equal. In such case, the similarity score, in particular, the similarity sub-score $S_A$ computed for a respective numeric attribute may be 1 in case the numeric values the two nodes are equal (coincide) and 0 in case the numeric values are not equal. In another example, the flows generator 220 may apply the subtraction operator to calculate the similarity sub-score $S_A$ based on a difference between the values of the respective attribute of the two nodes.

In another example, one or more of the node attributes may be string (text, characters, etc.) based node attributes, for example, the tree level number, a category (string) name, a condition, an action, a user interaction and/or the like. In such case, the flows generator 220 may compute the similarity score, specifically the similarity sub-score $S_A$ for one or more of the string based node attributes, for example, based on Levenshtein distance between the string values of the respective node attribute as known in the art. In another example, the flows generator 220 may compute the similarity sub-score $S_A$ for one or more of the string based node attributes based on cosine similarity computed between the string values of the respective attribute as known in the art.

Naturally, the similarity sub-scores are computed for each node attribute that is available in at least one of the two compared nodes for which the similarity score is computed.

However, it is possible that one or more node attributes may be available for only one of the two compared nodes, i.e. one or more node attributes may be available for one of the two compared nodes while unavailable for the other compared node and vice versa. In such case, when a value of a certain node attribute is only set for one of the two compared nodes, the flows generator 220 may set the similarity sub-score $S_A$ computed for the certain node attribute to zero ("0").

Assuming the set of predefined transactional flows includes a limited number K of labeled transactional flows, each of the K of predefined (labeled) transactional flows may include a parent node $N_i^P$, ($1 \leq i \leq K$) and one or more completion nodes $N_i^C$, ($1 \leq i \leq K$).

The flows generator 220 may thus use the similarity computation methods and metrics described herein before, for example, equation 1 to compute a similarity score (NSS) $S(N_{Cand}^C, N_i^C)$ for the candidate completion node designated $N_{Cand}^C$ with respect to each completion node of each of the labeled transactional flows designated $N_i^C$ ($1 \leq i \leq K$).

For example, assuming the flows generator 220 processing the exemplary tree structure 300 representing the virtual assistant and/or part thereof selects the node 302(75) as the candidate completion node of a new transactional node F(N). The flows generator 220 may compute the NSS for node 302(75) with respect to each of the completion nodes included in the plurality of subsets of nodes of the predefined transactional flows, for example, the transactional flows F1 and F2. The flows generator 220 may therefore compute the NSS for the node 302(75) with respect to the completion nodes 302(37), 302(58) and 302(73) of the predefined transactional flow F1 and 302(31), 302(49), 302(71) and 302(79) of the predefined transactional flow F2.

As shown at 110, the flows generator 220 may select the labeled transactional flow $F_I$ which includes the completion node producing the highest similarity score (NSS) $S(N_{Cand}^C, N_I^C)$ with the selected candidate completion node $N_{Cand}^C$.

Continuing the previous example, assuming the NSS between the candidate completion node 302(75) and the completion node 302(73) of the first predefined transactional flow F1 produces the highest score, the flows generator 220 may select F1 as $F_I$.

Optionally, at step 106 the flows generator 220 may select a plurality of N evaluated candidate completion nodes which are not included in any of the plurality of subsets of the labeled transactional nodes, for example, the predefined transactional nodes. The flows generator 220 may further compute the NSS for each of the N evaluated candidate completion nodes as described in step 108 with respect to each of the completion nodes of the labeled transactional flows, for example, the predefined transactional flows. The flows generator 220 may then apply one or more methods, techniques, algorithms and/or computations to determine and/or identify the candidate completion node $N_{Cand}^C$ among the N evaluated candidate completion nodes which produces the highest NSS $S(N_{Cand}^C, N)$ with one of the plurality of completion nodes of the labeled transactional flows which as described herein before is designated $F_I$. For example, the flows generator 220 may use argmax to identify and select the $N_{Cand}^C$ according to equation 2 below.

$$N_{Cand}^C \text{argmax}_N \max_{1 \le i \le K} S(N_i^C, N).  \qquad \text{Equation 2}$$

As shown at 112, the flows generator 220 may use the similarity computation methods and metrics described herein before, for example, equation 1 to compute a similarity score $S(N_i^P, M)$ for each candidate parent node $N_{Cand}^P$ of a plurality of M dialog nodes which are ancestors of the selected candidate completion node $N_{Cand}^C$ with respect to the parent node $N_I^P$ of the selected subset, i.e., the parent node of the selected predefined (labeled) transactional flow $F_I$.

Continuing the previous example, assuming the first predefined transactional flow F1 is selected as $F_I$, the flows generator 220 may compute a similarity score for each candidate parent node $N_{Cand}^P$ which is an ancestor of the selected candidate completion node 302(75), for example, 302(67), 302(61), 302(54), 302(46), 302(40), 302(34), 302(28), 302(21), 302(15), 302(10), 302(6) and 302(3) with respect to the parent node of the selected (labeled) transactional flow F1, i.e., the node 302(2).

As shown at 114, the flows generator 220 may select the candidate parent node which produces the highest similarity score with respect to the parent node of the selected subset, i.e., the parent node of the selected predefined transactional flow $F_I$.

Continuing the previous example, assuming the highest similarity score is produced for the candidate parent node 302(3) with respect to the node 302(2) which is the parent node of the selected predefined transactional flow F1, the flows generator 220 may select the node 302(3) as the parent node for the new transactional flow F(N).

As shown at 116, the flows generator 220 may generate automatically the new transactional flow by constructing the new transactional flow to comprise a respective subset of the plurality of dialog nodes which are descendants of the selected parent node.

Continuing the previous example, assuming the node 302(3) is selected as the parent node for the newly generated transactional flow F(N). In such case, the flows generator 220 may analyze the tree structure 300 to identify all dialog nodes which are descendants of the selected parent node 302(3), for example, nodes 302(6), 302(10), 302(15), 302(21), 302(22), 302(27), 302(28), 302(33), 302(34), 302(40), 302(41), 392(45), 302(46), 302(54), 302(55), 302(61), 302(67) and the selected completion node 302(75). The flows generator 220 may then generate automatically the new transactional flow F(N) which comprises the subset of the nodes which are descendants of the parent node 302(3) and defines a flow (path) between the nodes of the subset.

Prior to applying, including, embedding and/or integrating it in the virtual assistant, the newly generated transactional may be analyzed, evaluated and/or otherwise considered either by one or more automated tools and/or by one or more of the users (e.g. expert user, designer, etc.). In case the new transactional flow is approved, it may be labeled accordingly and added to the set of labeled flows of the virtual assistant, otherwise it may be ejected.

Optionally, in case of rejection, the new transactional flow may be adjusted, amended and/or otherwise altered manually and/or automatically to overcome one or more of the rejections indicted during the evaluation of the new transactional flow. For example, the flows generator 220 may repeat the process 100 from step 106 with an alternative candidate completion node selected from the plurality of nodes not included in the labeled transactional flows, for example, the set of predefined transactional flows. In another example, the flows generator 220 may repeat the process 100 from step 106 with another completion node of one of the labeled transactional flows which produces the next highest NSS with the selected candidate completion node. In another example, the flows generator 220 may repeat the process 100 from step 112 with another candidate parent node which produces the next highest NSS with the parent node of the labeled transactional flow.

As shown at 118, the flows generator 220 may branch to step 106 to repeat the process 100 to generate automatically an additional new transactional flow. The flows generator 220 may initiate a plurality of such iterations (repetitions) to generate a plurality of additional new transactional flows which may be labeled accordingly and added to the virtual assistant.

Naturally, at each additional iteration, the candidate completion node as well as the candidate parent nodes are selected from nodes which are not included in any of the labeled transactional flows either the initially received predefined transactional flows (step 104) and/or new transactional flows generated automatically by the flows generator 220 or manually by one or more of the users.

Figure 4:
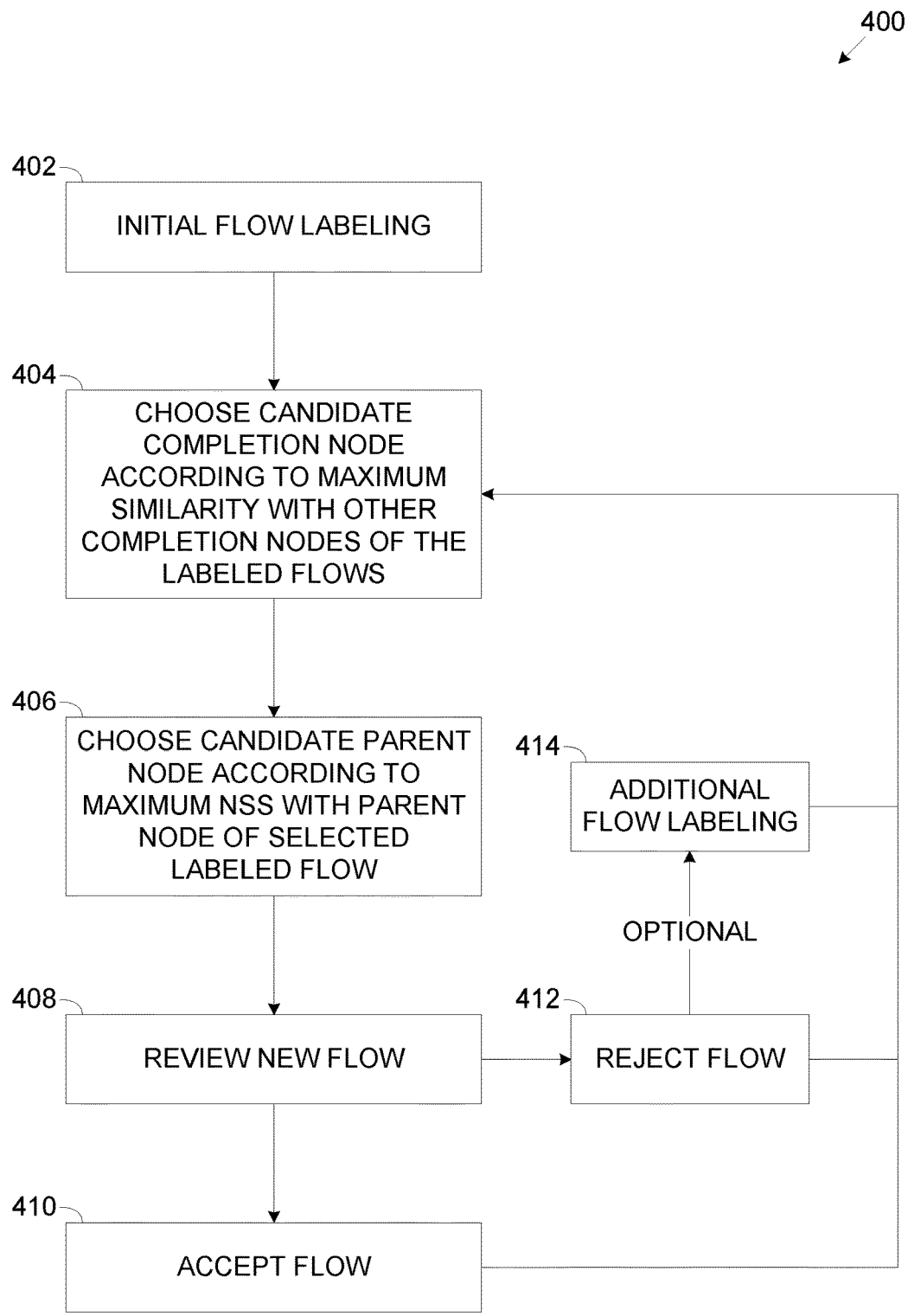
FIG. 4 is a block diagram of an exemplary sequence for generating automatically transactional flows for virtual assistants, according to some embodiments of the present invention.

Reference is now made to FIG. 4, which is a block diagram of an exemplary sequence for generating automatically transactional flows for virtual assistants, according to some embodiments of the present invention.

An exemplary sequence 400 may be executed, for example, by a flows generator such as the flows generator 220 executed by a flows generation system such as the flows generation system 200 to generate automatically one or more transactional flows for one or more of the virtual assistants.

As shown at 402, initial flow labeling may be done manually and/or automatically to define, construct and label a limited number of transactional flows for the virtual assistant. Each such predefined and labeled transactional flow may comprise a subset of dialog nodes of the plurality of nodes of the tree structure representing the virtual assistant.

As shown at 404, the flows generator 220 may select a candidate completion node which is not included in any of the subsets of the labeled transactional flows as described in step 106 of the process 100.

The flows generator 220 may further compute the NSS for the selected candidate completion node with respect to each of the completion nodes of each of the labeled transactional flows, for example, each of the predefined transactional flows as described in step 108 of the process 100.

The flows generator 220 may then select the labeled transactional flow comprising the completion node which produces the highest NSS with the selected candidate completion node as described in step 110 of the process 100.

As shown at 406, the flows generator 220 may compute the NSS for each candidate parent node which is an ancestor node of the selected candidate completion node and is not included in any of the subsets of the labeled transactional flows. Specifically, the flows generator 220 may compute the NSS for each candidate parent node with respect to the parent node of the selected labeled transactional flows as described in step 112 of the process 100.

The flows generator 220 may then select the candidate parent node which produces the highest NSS with the parent node of the selected labeled transactional flow as described in step 114 of the process 100.

The flows generator 220 may generate a new transactional flow which comprises all the dialog nodes which are descendants of the selected parent nodes described in step 116 of the process 100.

As shown at 408, the new transactional flow may be reviewed, for example, analyzed and/or evaluated either automatically and/or by one or more of the users, for example, the expert user, the designer and/or the like.

As shown at 410, the new transactional flow may be approved and may be thus labeled and applied (added, included, defined) to the virtual assistant.

As shown at 412, the new transactional flow may be rejected and discarded.

As shown at 414, which is an optional step, the rejected new transactional flow may be further labeled, for example adjusted, amended and/or altered by the flows generator 220 in attempt to overcome the rejections as described in step 116 of the process 100. For example, an alternative completion node and/or an alternative parent node may be selected for the new transactional flow.

Optionally, the flows generator 220 may repeat the sequence 400 after steps 410, 412 and/or 414 to generate one or more additional new transactional flows for the virtual assistant.

According to some embodiments of the present invention, the flows generator 220 may further maintain the virtual assistant, in particular the transactional flows of the virtual assistant after the virtual assistant is deployed for use.

For example, based on the interaction of a plurality of users with the virtual assistant, the flows generator 220 may collect, generate and/or compute analytics and/or statistics for one or more of the labeled transactional flows, either the predefined transactional flows and/or the automatically generated transactional flows. For example, the flows generator 220 may monitor the interaction of the plurality of users with the virtual assistant and log success events in which the user interacting with the respective transactional flow successfully accomplishes the task associated with the respective transactional flow. The flows generator 220 may further log failure events in which the user fails to complete the task and/or abandonment events in which the user abandons the task in the middle.

Based on the logged events, the flows generator 220 may generate analytics, for example, a success rate, a failure rate, an abandonment rate, an abandonment point, a potential failure root cause and/or the like. The flows generator 220 may output, for example, transmit, prompt, indicate and/or the like the collected and/or generated analytics data which may be used to improve one or more of the transactional flows.

Optionally, the flows generator 220 may automatically adjust, amend and/or alter one or more of the labeled transactional flows, either the predefined transactional flows and/or the automatically generated transactional flows according to the collected analytics to improve the transactional flows, for example, increase the success rate, reduce the failure rate, reduce the abandonment rate and/or the like. For example, assuming that based on the analytics, the flows generator 220 determines that many users abandon the virtual assistant and/or a certain transactional flow following a certain interaction defined by a certain dialog node of the certain transactional flow. In such case, the flows generator 220 may adjust automatically the certain transactional flow, for example, bypass the certain dialog node, add one or more explanatory and/or alternative nodes and/or the like to improve the interaction with the user and improve the probability that the users succeed to follow the entire certain transactional flow.

In another example, the flows generator 220 may monitor and track changes in the structure of the virtual assistant after deployed to assist users, specifically changes in the tree structure representing the virtual assistant. The flows generator 220 may output, for example, transmit, prompt, indicate and/or the like one or more indications that one or more of the labeled transactional flows may be affected by one or more of the changes in the tree structure.

Optionally, the flows generator 220 may automatically adjust, amend and/or alter one or more of the labeled transactional flows, either the predefined transactional flows and/or the automatically generated transactional flows according to such changes in the tree structure to ensure efficiency, consistency, accuracy, reliability and/or robustness of the respective transactional flow(s). For example, assuming that as result of a certain change to the tree structure of the virtual assistant, a certain dialog node is removed. Further assuming that the certain dialog node is included in the subset of a certain labeled transactional flow. In such case, the flows generator 220 may adjust automatically the certain transactional flow, for example, remove the certain dialog node, bypass the certain dialog node, remove the entire certain transactional flow and/or the like to ensure consistency, accuracy, reliability and/or robustness of the certain transactional flow.

Figure 5:
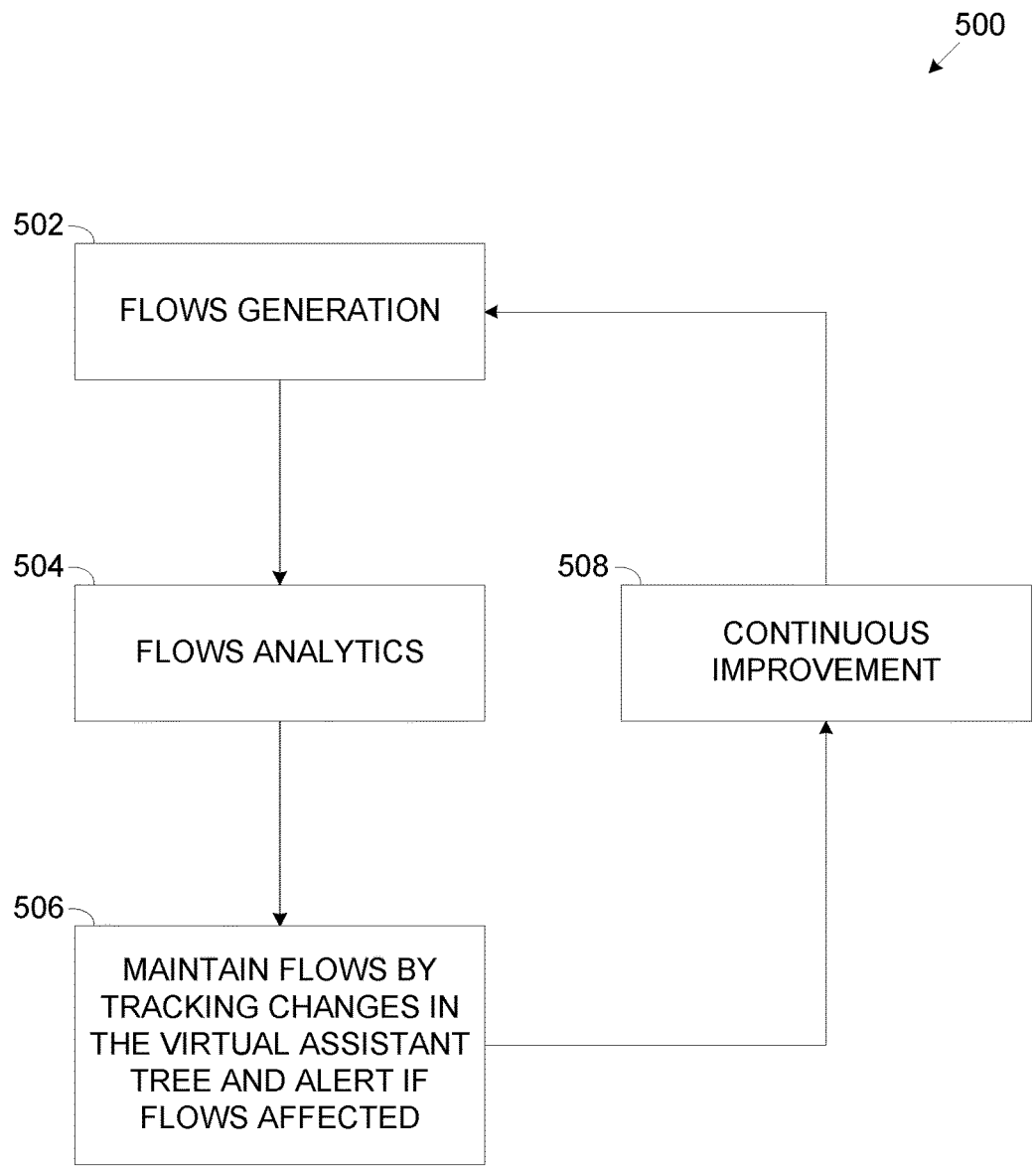
FIG. 5 is a block diagram of an exemplary sequence for maintaining transactional flows automatically generated for virtual assistants, according to some embodiments of the present invention.

Reference is now made to FIG. 5, which is a block diagram of an exemplary sequence for maintaining transactional flows automatically generated for virtual assistants, according to some embodiments of the present invention.

An exemplary sequence 500 may be executed, for example, by a flows generator such as the flows generator 220 executed by a flows generation system such as the flows generation system 200 to maintain automatically one or more one or more of the transactional flows of one or more of the virtual assistants.

As shown at 502, a plurality of transactional flows may be generated and labeled for the virtual assistant. These transactional flows may include the predefined transactional flows as well as the transactional flows automatically generated by the flows generator 220.

As shown at 504, the flows generator 220 may collect and/or compute flow analytics for one or more of the labeled transactional flows, for example, the success rate, the failure rate, an abandonment rate, an abandonment point, a potential failure root cause and/or the like.

As shown at 506, the flows generator 220 may monitor the tree structure representing the virtual assistant to track one or more changes in the tree structure. The flows generator 220 may further assess and/or estimate whether one or more of the labeled transactional flows may be affected by one or more of the detected change(s).

As shown at 508, the flows generator 220 may output the flow analytics and/or the effect of changes in the tree structure to enable continuous improvement of the transactional flows. For example, one or more of the transactional flows may be adjusted based on the computed analytics in order to reduce the failure rate of the respective transactional flow. In another example, one or more of the transactional flows may be adjusted according to one or more of the changes in the tree structure to ensure consistency, efficiency and/or reliability of the respective transactional flows.

Optionally, the flows generator 220 automatically adjusts one or more of the transactional flows based on the computed analytics and/or according to the one or more of the changes detected in the tree structure of the virtual assistant.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms virtual assistants and tree structures are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of generating automatically transactional dialog flows for a virtual assistant, comprising:
   using at least one processor for:
      obtaining a tree structure representing a virtual assistant and comprising a plurality of dialog nodes;
      analyzing a set of predefined transactional flows each comprising a respective subset of a plurality of subsets, each subset comprising respective nodes of the plurality of dialog nodes descending from a respective parent node to respective at least one completion node;
      selecting a candidate completion node which is not included in the plurality of subsets of the predefined transactional flows;
      computing a similarity score for the candidate completion node with respect to each completion node in each of the plurality of subsets;
      selecting one of the plurality of subsets comprising a respective completion node producing a highest similarity score;

computing a similarity score for each candidate parent node of a plurality of dialog nodes which are ancestors of the candidate completion node with respect to the parent node of the selected subset;
selecting a candidate parent node having a highest similarity score; and
generating automatically a new transactional flow of the virtual assistant comprising a respective subset of respective nodes of the plurality of dialog nodes which are descendants of the selected parent node.

2. The method of claim 1, further comprising selecting the candidate completion node from a plurality of evaluated candidate completion nodes which is not included in the plurality of subsets according to highest similarity score of the evaluated candidate completion nodes with each completion node in each of the plurality of subsets.

3. The method of claim 1, further comprising selecting at least one additional candidate completion node for generating at least one additional new transactional flow of the virtual assistant.

4. The method of claim 1, further comprising selecting at least one alternative candidate completion node in case the new transactional flow is rejected.

5. The method of claim 1, wherein the similarity score is computed by aggregating a plurality of similarity sub-scores, each of the plurality of similarity sub-scores is computed between respective attributes of a plurality of attributes of each of the nodes for which the similarity score is computed.

6. The method of claim 5, wherein each of the plurality of dialog node is associated with at least one of a plurality of attributes comprising: a node identifier, an identifier of a parent node, an identifier of a next execution node, a node condition, a condition of a parent node, a condition of a next execution node, a value of a context variable of the node, a value of a context variable of a parent node, a value of a context variable of a next execution node, a response text of the node, a response text of a parent node, a response text of a next execution node, a node level in the tree structure, a node category, a category of a parent node, and a category of a next execution node.

7. The method of claim 5, wherein the similarity score is computed based on at least one algebraic operator for numeric attributes.

8. The method of claim 5, wherein the similarity score is computed based on Levenshtein distance for string based attributes.

9. The method of claim 5, wherein the similarity score is computed based on cosine similarity of sentence embeddings for string based attributes.

10. The method of claim 5, wherein each of the plurality of similarity sub-scores is computed for a respective attribute that is available for at least one of the node for which the similarity score is computed.

11. The method of claim 10, wherein the respective similarity sub-score computed for at least one of the attributes is set to zero (0) in case the respective attribute available for only one of the nodes for which the similarity score is computed.

12. The method of claim 5, further comprising at least one of the plurality of attributes is assigned a weight for the computation of the similarity score.

13. The method of claim 1, further comprising adjusting the new transactional flow according to analytics collected for the new transactional flow.

14. The method of claim 1, further comprising adjusting the new transactional flow according to at least one change in the tree structure.

15. A system for generating automatically transactional dialog flows for a virtual assistant, comprising:
at least one processor configured to execute a code, the code comprising:
code instructions to obtain a tree structure representing a virtual assistant and comprising a plurality of dialog nodes;
code instructions to analyze a set of predefined transactional flows each comprising a respective subset of a plurality of subsets, each subset comprising respective nodes of the plurality of dialog nodes descending from a respective parent node to respective at least one completion node;
code instructions to select a candidate completion node which is not included in the plurality of subsets of the predefined transactional flows;
code instructions to compute a similarity score for the candidate completion node with respect to each completion node in each of the plurality of subsets;
code instructions to select one of the plurality of subsets comprising a respective completion node producing a highest similarity score;
code instructions to compute a similarity score for each candidate parent node of a plurality of dialog nodes which are ancestors of the candidate completion node with respect to the parent node of the selected subset;
code instructions to select a candidate parent node having a highest similarity score; and
code instructions to generate automatically a new transactional flow of the virtual assistant comprising a respective subset of respective nodes of the plurality of dialog nodes which are descendants of the selected parent node.

16. A computer program product for generating automatically transactional dialog flows for a virtual assistant, the computer program product comprising:
at least one computer readable storage media having thereon:
first program instructions executable by at least one processor to cause the at least one processor to obtain a tree structure representing a virtual assistant and comprising a plurality of dialog nodes;
second program instructions executable by the at least one processor to cause the at least one processor to analyze a set of predefined transactional flows each comprising a respective subset of a plurality of subsets, each subset comprising respective nodes of the plurality of dialog nodes descending from a respective parent node to respective at least one completion node;
third program instructions executable by the at least one processor to cause the at least one processor to select a candidate completion node which is not included in the plurality of subsets of the predefined transactional flows;
fourth program instructions executable by the at least one processor to cause the at least one processor to compute a similarity score for the candidate completion node with respect to each completion node in each of the plurality of subsets;
fifth program instructions executable by the at least one processor to cause the at least one processor to select one of the plurality of subsets comprising a respective completion node producing a highest similarity score;

sixth program instructions executable by the at least one processor to cause the at least one processor to compute a similarity score for each candidate parent node of a plurality of dialog nodes which are ancestors of the candidate completion node with respect to the parent node of the selected subset;

seventh program instructions executable by the at least one processor to cause the at least one processor to select a candidate parent node having a highest similarity score; and eighth program instructions executable by the at least one processor to cause the at least one processor to generate automatically a new transactional flow of the virtual assistant comprising a respective subset of respective nodes of the plurality of dialog nodes which are descendants of the selected parent node.

* * * * *